March 28, 1961 W. BRUCH 2,977,469

CHANNEL SWITCHING TUNER

Filed Dec. 6, 1957 4 Sheets-Sheet 1

INVENTOR
WALTER BRUCH

BY [signature]

PATENT AGENT

March 28, 1961 W. BRUCH 2,977,469

CHANNEL SWITCHING TUNER

Filed Dec. 6, 1957 4 Sheets-Sheet 2

INVENTOR
WALTER BRUCH

BY [signature]

PATENT AGENT

March 28, 1961 W. BRUCH 2,977,469

CHANNEL SWITCHING TUNER

Filed Dec. 6, 1957 4 Sheets-Sheet 3

INVENTOR
WALTER BRUCH

BY [signature]

PATENT AGENT

March 28, 1961 W. BRUCH 2,977,469

CHANNEL SWITCHING TUNER

Filed Dec. 6, 1957 4 Sheets-Sheet 4

INVENTOR
WALTER BRUCH

BY [signature]

PATENT AGENT

United States Patent Office 2,977,469

Patented Mar. 28, 1961

2,977,469

CHANNEL SWITCHING TUNER

Walter Bruch, Hannover, Germany, assignor to Telefunken G.m.b.H., Berlin, Germany Filed Dec. 6, 1957, Ser. No. 701,033

Claims priority, application Germany Dec. 11, 1956

3 Claims. (Cl. 250—40)

For coarse tuning of television receivers to the channels in the various wave ranges so-called channel switches are usually used, similar to the well-known coil turret where the sets of coils corresponding to the various television channels are mounted on a rotary part provided with contacts, where these contacts are selectively closed with stationary contacts solidly connected to the receiver circuit. In such channel switches, the sets of coils are usually mounted on the lateral surface of oblong segments which have the contacts on the other side. These segments are then arranged on the periphery of a drum which may reach considerable dimensions if many television channels are involved.

Also known is a high-frequency coil system, where several coils are arranged on the lateral surface of a rotary disk and where the contacts are mounted on the periphery of this disk. In such an arrangement, however, relatively long conductors are required between the coils and the individual contacts which, at the frequencies involved, are a disadvantage. Also, with this arrangement, for each set of coils, for instance three coils, three series-connected disks are required.

According to the invention, it is proposed that in the case of a channel switch where the coils are mounted on a lateral surface of a rotary disk, the contacts be arranged on the side of the disk opposite the sets of coils, and the coils be mounted on coil forms having adjustable cores therein, the cores being accessible axially of the coil forms to permit adjustment of their positions.

To clarify the invention, several embodiments are described as shown in the attached drawings.

Figure 1:
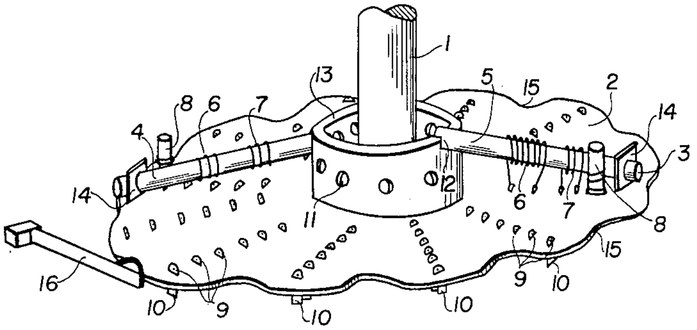
Figure 1 is a perspective view of a coil-supporting disk assembly according to the present invention.
Figures 2, 3A, 3B, 3C:
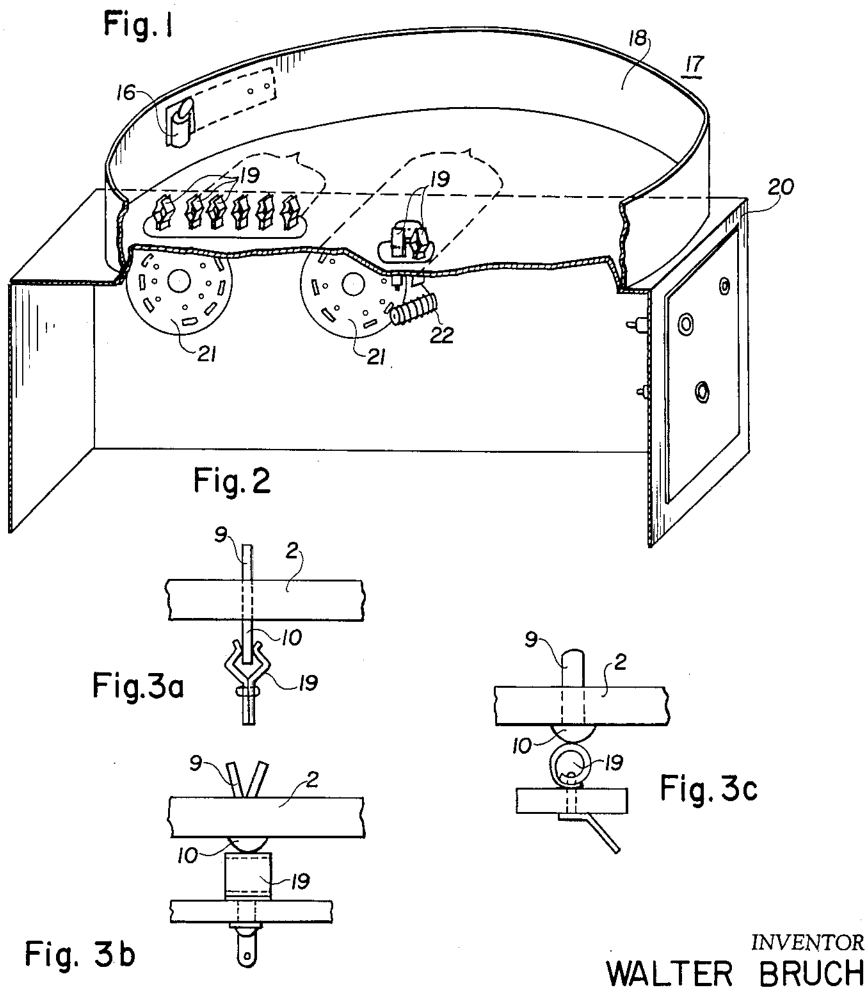
Figure 2 is a perspective view partly in cross section of a housing for receiving the assembly of Figure 1.
Figure 4:
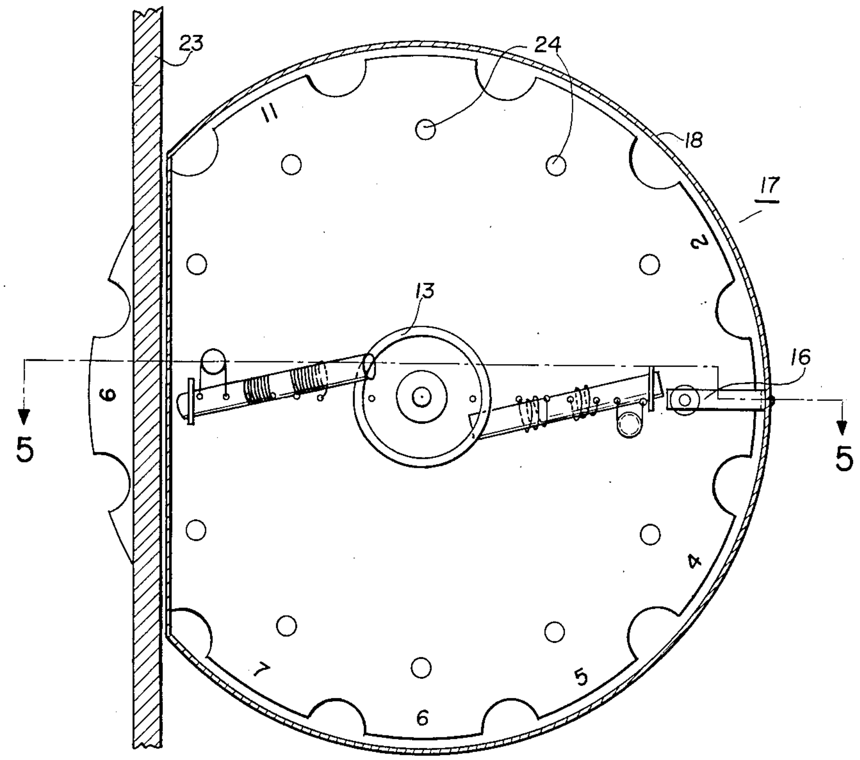
Figure 5:
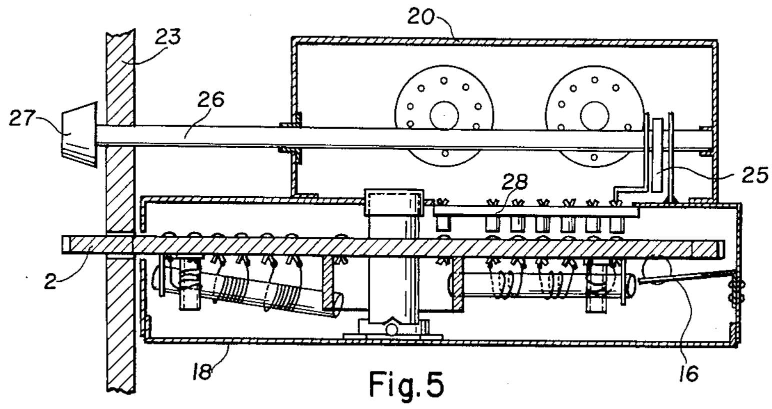
Figure 6:
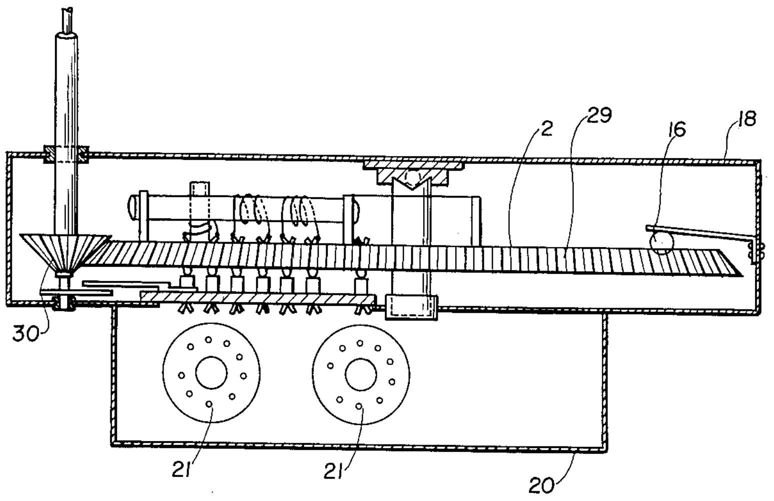
Figure 7:
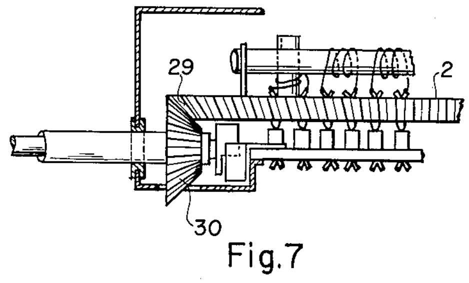
Figures 8, 9:
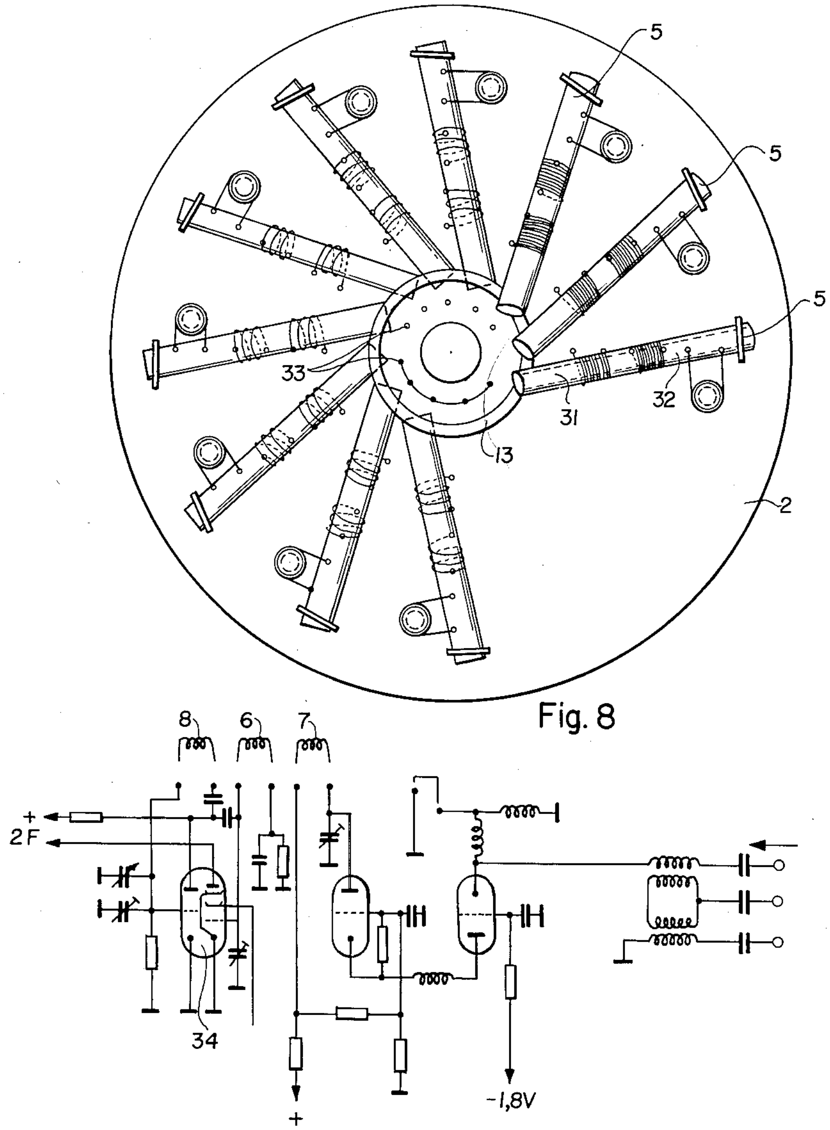

Figures 3*a*, 3*b* and 3*c* are enlarged fragmentary detail views showing contacts suitable for use with the present channel switch assembly;

Figure 4 is a plan view partly in section of a modified embodiment according to the invention;

Figure 5 is an elevation view partly in section of the embodiment of Figure 4;

Figure 6 is an elevation view partly in section of still another modified embodiment;

Figure 7 is a fragmentary view of still a further modified form of the invention;

Figure 8 is a plan view of an embodiment of the invention similar to that shown in Figure 1;

Figure 9 is a schematic diagram of a circuit suitable for use with one of the switching assemblies shown in the drawings.

Fig. 1 illustrates a disk 2 to be rotated by an operating shaft 1, on the top side of which are mounted the coil sets 3, 4, each being designed for a different television channel. Each set consists of a coil assembly 5, mounted approximately radially and essentially parallel to the disk plane, consisting of two coils 6 and 7 and in addition a coil 8 mounted perpendicularly to the disk plane and adjacent to its periphery. The terminals of the coils are connected to the contact risers 9 provided directly adjacent to the coils, the contacts 10 of which are located on the opposite lateral face of the disk. The contacts belonging to each set of coils are arranged on the disk essentially radially, while the corresponding contacts of the various sets of coils are located on concentric circles about the shaft of disk 2. The long coil assemblies 5 are in the illustrated design examples mounted on one end in or on a ring 13, located near the center of disk 2 and provided with holes 11 or slots 12, on the other end in holders 14 at the periphery of disk 2; they may, however, in a simple design also be cemented directly to the surface of the disk. The above described arrangement of the coils has the effect that each individual coil can be tuned during operation without removing the channel switch. The coils to be tuned by a core are then on one end located in the slots 12 of ring 13, while the other coils tuned, for instance, by deformation of their winding are located in the holes. In order to obtain detent positions for the individual channels, slots 15 are provided at the periphery of disk 2 which engage the stationary spring 16.

Fig. 2 shows a housing 17 for enclosing the rotary disk 2 shown in Fig. 1. This housing 17 consists of a cylindrical part 18 in which are located the stationary contacts 19 corresponding to the movable contacts 10, the above-mentioned spring 16 for obtaining the holding positions as well as bearings for supporting the rotary disk 2; the housing also includes a little box 20 with the socket 21 of the preamplifier and the mixing tubes, as well as the switching elements 22 and conductors of this circuit, possibly also terminals for the antenna input, etc.

The stationary contacts can be designed, according to Fig. 3, depending on the type of movable contacts, either as knife contacts or as spring contacts. The Fig. 3*a* shows a knife contact arrangement with part of the rotatable disk 2, the contact riser 9 and the movable contact 10 that engages a U-shaped stationary contact 19. The motion of the movable contact, when the disk is rotated, is here perpendicular to the plane of the drawing. Figs. 3*b* and 3*c* show, on the other hand, a spring contact arrangement where the contact riser 9 in the rotatable disk 2 belongs to a rivet-like contact 10, which acts upon an elastic stationary contact 24 that, in this design example, consists of a spring bent into a ring, but can also be made in the form of an oblong spring.

The Fig. 4 illustrates a design example of the invention where the disk 2 in the assembly extends through an opening in the housing 23 of the television receiver and where the periphery of this disk is simultaneously used as operating means. For this purpose, the channel numbers are imprinted on the disk periphery either on a lateral face or on the side surface. In addition, the disk periphery is knurled in order to facilitate operation. Likewise, the slots provided for obtaining the holding position at the periphery of the disk can be used to facilitate operation. In this design example, the housing is, in accordance with the part of the rotary disk extending through the receiver housing to the outside, so designed that it is in contact with the inside of the receiver housing and possibly bolted to it. The coil sets and correspondingly the contacts do not extend to the outer periphery of the disk, but are located more near the center. There is also in this design example, the side view of which is illustrated in Fig. 5, provided an additional tuning means for vernier tuning, for instance a condenser, the operating shaft of which is carried through the housing wall to the outside adjacent to and preferably above the rotary disk. In cases where the periphery of the disk is designed so as to facilitate operation, but itself is no longer suitable to position the disk, detent holes 24 or indentations are provided on one of the lateral surfaces of the disk which engage the detent springs 16.

Fig. 5 illustrates the arrangement according to Fig. 4 in cross section. Above the housing 18, mounted on the housing wall 23 with the rotary disk 2 extending through the wall, the small box 20 is provided in which the tube sockets 21 and the switching elements 22 as well as a variable condenser 25 is arranged for vernier tuning. This condenser 25 is operated by a shaft 26 through an operating knob 27 located, for instance, above the rotary disk 2. This figure, also illustrates that the stationary contacts 19 are fastened on a separate plastic plate 28.

In some cases it may, for space reasons, be necessary to arrange the operating shaft of the disk parallel to the axis of rotation of the disk shaft. In this case, the periphery of the disk is, accordang to Fig. 6, provided with a gear rim 29 which engages a bevel gear on the operating shaft. A similar design is shown in Fig. 7, where the operating shaft is mounted parallel to the plane of the rotatable disk. In this example, too, the rotary disk is driven by the operating shaft through a bevel gear.

Fig. 8 shows a plan view of disk 2 which illustrates the arrangements of the coils in their space relation. They are preferably arranged not radially, but in such a way that the tuning cores 31 and 32 located in the coil assemblies 5 can be adjusted from the periphery of the disk as well as from the shaft. One can see also in this assembly the contacts 33 which are preferably located within ring 13 and which engage the stationary contacts 19 shown nearest the center in Fig. 2.

The application of a channel switch according to Figs. 1–8 can be seen from the circuit diagram of Fig. 9, where the high frequency input signals are fed into an input stage connected as cascode and from there to the following mixing tube 34 through a band filter from the coils 6 and 7 provided in the channel switch. The corresponding oscillator coil 8 is also included in the channel switch.

I claim:

1. A channel switch rotary assembly for television receivers, comprising a shaft; a disk mounted on said shaft perpendicular thereto; a plurality of coil sets mounted on one face of the disk and each set tuning one channel and including at least three coils; a set of contacts secured to the disk adjacent each set of coils and on the opposite face of the disk therefrom, each coil set including at least two coil forms, one form being mounted perpendicular to the face of the disk, and the other coil form being disposed along the face of the disk and having two coils mutually spaced along the axis of the form; tuning cores in the forms and within each coil and axially adjustable from an end of the form, each two-coil form being mounted to the disk with its outer end near the periphery of the disk and its inner end near the center of the disk and offset therefrom sufficiently to permit access along the axis of the form for adjustment of the core from a path passing approximately tangent to said shaft; and coil-form supporting means on the disk and engaging the inner ends of the two-coil forms and supporting at least some of the inner ends farther from the surface of the disk than their outer ends to incline the axes of these forms so that they pass above the coil forms on the diametrically opposite sides of the disk to permit axial access to tune said cores.

2. In an assembly as set forth in claim 1, said coil-form supporting means comprising a ring mounted on the disk on the coil-form face thereof and coaxial with the shaft, said ring having a cut-out adjacent to and receiving the inner ends of each two-coil form.

3. In an assembly as set forth in claim 1, each coil form mounted peripendicular to the face of the disk being mounted thereon near the periphery of the disk and between the outer ends of the adjacent two-coil forms.

References Cited in the file of this patent

UNITED STATES PATENTS

| | | |
|---|---|---|
| 1,873,658 | Murdock | Aug. 23, 1932 |
| 2,441,116 | Mackey | May 4, 1948 |
| 2,446,701 | Greene | Aug. 10, 1948 |
| 2,545,681 | Zepp | Mar. 20, 1951 |
| 2,643,361 | Mackey | June 23, 1953 |
| 2,672,592 | MacCheyne | Mar. 16, 1954 |
| 2,682,645 | Patla | June 29, 1954 |
| 2,807,724 | Felt | Sept. 24, 1957 |
| 2,825,812 | Felt | Mar. 4, 1958 |
| 2,868,985 | Carlson | Jan. 13, 1959 |

FOREIGN PATENTS

| | | |
|---|---|---|
| 685,554 | Germany | Nov. 30, 1939 |